Oct. 23, 1956 — C. T. CHAVE — 2,767,966
PERFORATED BUBBLE TRAY
Filed May 6, 1953

INVENTOR.
CHARLES T. CHAVE
BY
Morgan, Finnegan, Durham & Pine
ATTORNEYS

United States Patent Office 2,767,966
Patented Oct. 23, 1956

2,767,966
PERFORATED BUBBLE TRAY

Charles T. Chave, Wellesley, Mass., assignor to Stone & Webster Engineering Corporation, Boston, Mass., a corporation of Massachusetts Application May 6, 1953, Serial No. 353,300

7 Claims. (Cl. 261—113)

This invention relates to so-called bubble trays to be used in fractionating columns, stripping columns and direct contact heat transfer apparatus for contacting liquid and vapor, and relates more particularly to perforated bubble trays for such usage.

Objects and advantages of the invention will be set forth in part hereinafter and in part will be obvious herefrom, or may be learned by practice with the invention, the same being realized and attained by means of the steps, combinations and improvements pointed out in the appended claims.

The invention consists in the novel combinations and improvements herein shown and described.

Bubble trays in the form of flat perforated plates are not new to the distillation art. They have been employed with downcomers, permitting the liquid to flow across and off the edge of the plate, and attempts have been made to use them without downcomers in such a manner that the liquid flows down through the holes countercurrent to the vapor flowing upwards.

Experience has shown that in the latter arrangement with no downcomers, utilizing the same holes for the passage of both vapor and liquid, in general, both do not pass through the holes simultaneously in a countercurrent direction. The usual action is one of unstable spurting of vapor through the holes followed by draining of liquids through these same holes. This produces a wave action on the plates so that vapor spurts up through the trough of the waves and liquid drains down below the crest of the waves. This instability of performance is undesirable, since it results in the release of vapor through the lowest depth of liquid and since it causes a restricted liquid downflow capacity due to the intermittent action of the discharging liquid. It also increases entrainment.

Experience has also shown that in the arrangement with downcomers and weirs, difficulties have been experienced with the downflow capacity of both perforated plates and conventional bubble cap plates, because of the aeration of the liquid flowing from the plates which reduces the apparent density of the fluid and increases the pressure drop of liquid flowing through the downcomers.

It is among the objects of this invention to enable stability of operation to be achieved with a perforated bubble plate or tray even at low gas flow rates, to the end that the creation of high wave crests of aerated liquid on the tray will be completely, or substantially completely, eliminated or avoided, thus permitting the closer spacing of the plates in the bubble tower or other fractionating apparatus, and reducing entrainment, and to the end also that through the use of perforations the flow of vapor may be broken into the fine streams effecting the maximum contact of liquid and vapor, and that unaerated liquid or liquid of low aeration will flow continuously rather than intermittently through the discharge holes and high liquid downflow capacity thus be effected.

It is a further object of this invention to provide a new and improved apparatus for the rectification of gaseous and/or vaporous mixtures and to provide a highly improved and simplified stable operating perforated bubble tray for the purpose of discharging liquid through a portion of the holes in the tray.

Other objects and advantages of this invention reside in its avoidance of complicated tray structures including downcomers to the end that the construction may be simplified, the cost reduced and accurate alignment of each tray obtained with the others above and below. Moreover, by reason of the inherent simplicity of this new and improved tray, they can be readily fabricated in sections and installed without encountering difficult and time-consuming operations normally experienced with bubble trays of the prior art.

In general, the foregoing ends and objects are accomplished in accordance with this invention through the provision of a perforated bubble tray whose surface is of a configuration to provide a plurality of depressed portions over the perforated area of the tray enabling the creation on the tray surface in the perforated area of zones of liquid overlying the perforations and imposing higher static head upon those perforations from which it is intended liquid, primarily, shall issue than upon those from which it is intended vapor, primarily, shall issue.

The depressed portions are preferably formed in a regular pattern in the surface of the perforated tray. They may be straight or circular, or may be dimensionally discrete indentations in the tray surface. By reason of the differential static pressure produced, the liquid is adapted to discharge continuously in a stable manner from these depressed portions, while the vapor is adapted to discharge continuously in a stable manner from the "raised" portions of the tray.

It will be apparent that the depths of the depressed portions may be adjusted by design to increase the liquid head thus promoting drainage, and the relative areas of depressed and companion "raised" portions may be selected to take care of the relative amounts of gas and liquid flowing through the apparatus. The perforations permit the upward flow of vapor through the tray to be broken into fine streams effecting the maximum contact of liquid and vapor and, since the downflow capacity of the plate may be adjusted by proper selection of the area in the depressed portion, high liquid downflow rates may be obtained.

In the accompanying drawings which form part of the instant specification and are to be read in conjunction therewith and in which like numbers refer to like parts throughout the several views.

Figures 1, 2:
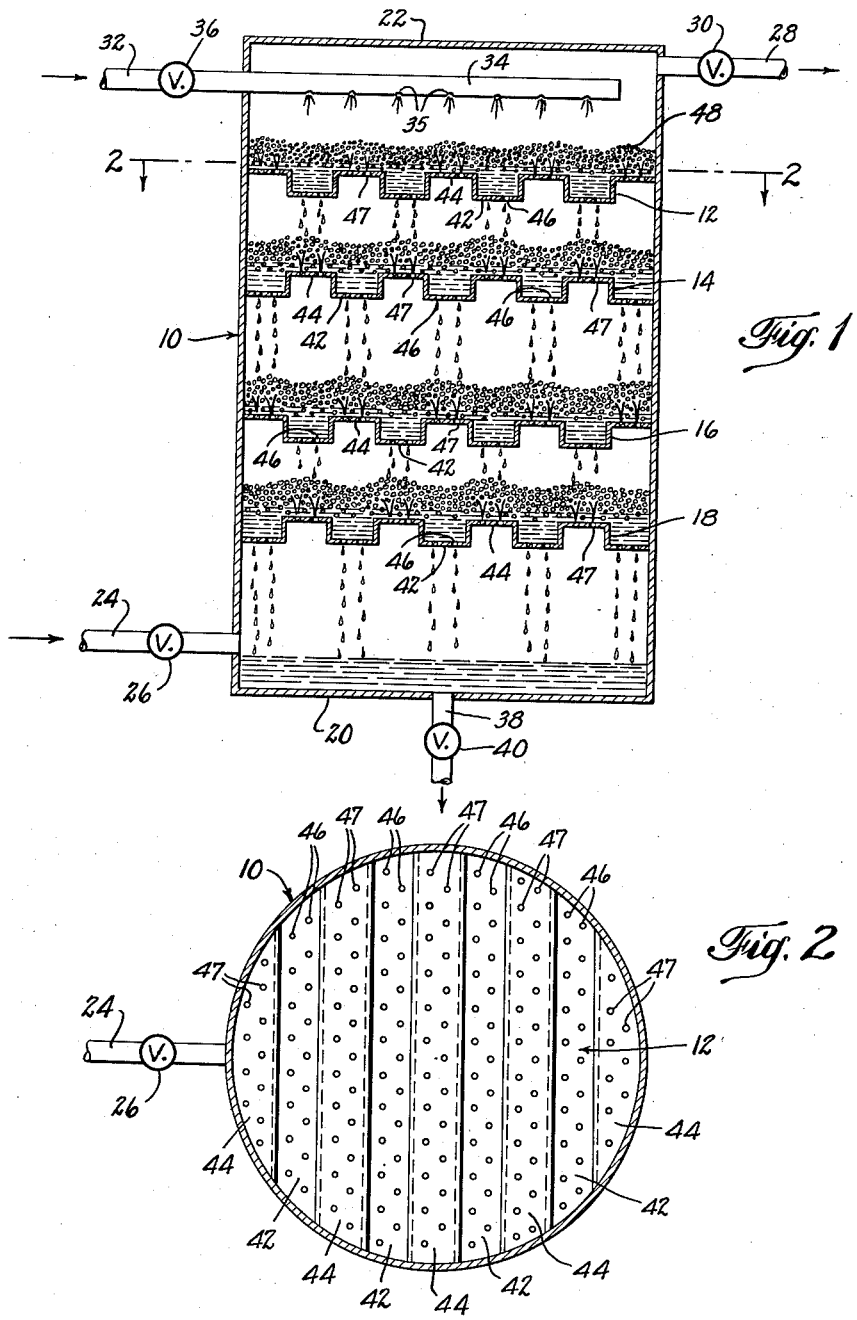
Fig. 1 is a generally diagrammatic view in vertical section of a fractionating or rectifying column embodying a preferred form of bubble tray in accordance with this invention, the view being taken along substantially a vertical medial plane of the column.
Fig. 2 is a view in section taken along the line 2—2 of Fig. 1.

Referring now more particularly to the accompanying drawings, Fig. 1 illustrates a fractionating or rectifying tower having a series of four perforated bubble trays 12, 14, 16 and 18 arranged one above the other in suitably spaced relation. The column 10 is closed at the bottom 20 and top 22 and is provided with a number of conduits communicating with the interior thereof. The feedstock, preferably in vapor form, enters the tower through a conduit 24 controlled by a valve 26. The entering vapor passing upwardly through the tower is rectified on the bubble trays 12, 14, 16 and 18, and the overhead product is removed by the conduit 28 having a valve 30 to control the flow. In normal operations well known in the art, the product removed as overhead, is cooled externally of the tower and fluid condensed out is reintroduced as reflux liquid into the tower as by means of the reflux conduit 32 which may terminate in a distributor 34 having openings 35 for discharging the cool reflux liquid into the tower above the tray 12. Conduit 32 is also controlled by a valve 36, as are the other conduits. During the fractionating process, heavy residues collect in the bottom of the tower, generally referred to as "bottoms," and maybe discharged as by means of a conduit 38 controlled by valve 40, in the column base 20.

Each of the trays 12, 14, 16 and 18, as here preferably embodied, is circular and is of a surface configuration to provide a plurality of depressions or "wells" 42 and companion "raised" portions 44 therebetween extending across the tray in a direction parallel to a diameter of the tray. A plurality of drain openings or perforations 46 are formed in each of the depressions 42 through which it is intended liquid, primarily, shall drain downwardly. Likewise, a plurality of vent openings or perforations 47 are formed in the "raised" portions 44 through which it is intended gas and/or vapor, primarily, shall escape upwardly through liquid on the tray. The relative area of depressed and companion "raised" portions of the tray may be adjusted by design to take care of the relative amounts of gas and liquid flowing through the apparatus. The downflow capacity of the plate may be adjusted by proper selection of the area in the depressed portion so as to obtain high liquid downflow rates, and the depths of the depressed portions can be adjusted by design to increase the liquid head promoting drainage. As here preferably embodied, each depression 42 is slightly greater in width than in depth and is approximately equal in width to the undepressed or "raised" parts 44 of the tray by which the depressions are spaced one from the other.

In accordance with this invention, moreover, the arrangement of the depressions in a given tray of the series of trays relative to the arrangement of the depressions in the immediately preceding or succeeding tray of the series is such that, as is shown in Fig. 1, the depressions in each tray are, preferably, in staggered relation to the depressions in the trays immediately above and below. In other words, the wave form of each tray in vertical section, as seen in Fig. 1, is 180° out-of-phase with that of the tray immediately above and/or below. By this arrangement, each depressed portion or well 42 overlies an undepressed or "raised" portion of the tray immediately below. Thus, vapor escaping upwardly from the perforations 47 in a given tray is caused to flow generally transversely of the tower between trays in order to reach vent openings 47 in the next higher tray. Thus, the rising vapor flows across the downcoming rain of liquid between trays to effect a further degree of gas and liquid contact in the countercurrent flow of gas and liquid.

The size and number of the holes 46 and 47 is determined by the relative rates of liquid and vapor flow desired for given circumstances and to enable the maintenance of the requisite height of liquid above the surface of the undepressed parts 44 of the tray. It will be understood that if the required depth of the depressed parts 42 and, hence, of the liquid therein, is X, in order that upward flow of vapor through the openings 46 will be prevented, then the depth of the body of liquid to be maintained on the undepressed or "raised" areas 44 should be less than X if vapor is to flow upwardly through the holes 47 in these "raised" areas. This results in the creation of zones of liquid of different static heads on alternate areas of the tray, thus imposing higher static head upon the perforations 46 in the depressed areas than upon the perforations 47 in the "raised" areas. Now, through control of the pressure of the rising gas or vapor between the limits defined by the high and low static heads, the gas may be caused to find its way upwardly through the paths of least resistance which are the openings 47 in the undepressed areas 44 but not through the openings 46. During this time unaerated liquid, or liquid of low aeration, will flow downwardly through the openings 46 of the depressed areas 42 since this liquid has a greater downward pressure than that of the rising gas.

This phenomenon produces a new and unexpected result in that substantially the entire upper portion at least of the body of liquid on the tray, with the exception possibly of that contained within the depressions, is transformed into a circulating mass or froth of relatively minute bubbles 48, as diagrammatically indicated in Fig. 1, thus promoting a thorough intermixture of the liquid and vapor. In this way all the liquid is necessarily subjected to the action of the vapor so that more highly refined fractions can be attained.

Through the creation of zones of liquid imposing higher static pressures on the perforations in the depressed portions than in the undepressed portions, the tray is very much more stable than known prior devices, and high wave crests of the aerated liquid are avoided thus permitting closer spacing of the plates or trays within the column. Moreover, since the liquid flowing downwardly through the holes in the depressed parts 42 is unaerated or of low aeration, its rate of flow can therefore be adjusted by design with a high degree of precision by varying the size of the openings 46. With aerated fluids, however, such high degrees of control are not attainable.

In the design of a tray in accordance with the invention, the depths of the depressed portions may be adjusted by design to increase the liquid head in order to promote drainage and the relative areas of depressed and undepressed parts may be selected to take care of the relative amounts of gas and liquid flowing through the apparatus. These features permit the design of perforated trays with high degrees of stability even at low gas flow rates and with little or no tendency of the gas to spurt through the openings followed by the draining of liquids through these same holes, as in prior devices.

While it has been found that the depth of the depressions and the size of the holes are not critical, for normal applications the holes 46 and 47 may advantageously range in size from one-eighth inch to five-eighths inch in diameter and the depth, X, of the depressed portions 42 may range from about one-half inch to six inches. The ratio of the total depressed area to the plate or tray area can also be varied to meet predetermined requirements but this ratio should take into consideration the ratio the area of all the openings 46 in the depressed portions bears to the area of all the openings 47 in the undepressed portions 44. Another advantage is that with this tray the tower diameter is not critical and the invention can be applied with equal efficiency to all sizes of apparatus.

While only one embodiment of the invention has been illustrated, it is apparent that the depressions are not limited to rectangular forms and may be arranged in any way that will result in the creation of zones of liquid that will provide the desired differential static heads. For instance, the depressions instead of being straight and parallel as in Figs. 1 and 2 may be arranged in concentric formations or take the form of a plurality of discrete depression or cups. Each of the trays 12, 14, 16 and 18 is of course sealed marginally to the wall of tower casing 10 to prevent leakage of fluid about the edges so that all of the counterflowing fluids must pass through the openings 46 and 47.

Although the illustrated embodiment has been described in the case where the feedstock is preferably in vapor form, it will be understood that the feedstock may be a liquid or a liquid vapor mixture. If the feed is a liquid, it will be superheated or contain dissolved gases so as to permit flashing of vapors therefrom on introduction into the tower, or alternatively, a boiling device such as is commonly used in normal fractionating operations well known in the art, would be attached to or incorporated in the bottom of the tower. It will be understood, moreover, that the feedstock to be operated on may, in general, be a mixture of components of different boiling points such, for example, as a wide-boiling petroleum fraction, to be separated into fractions of desired narrower boiling range within the tower. It will be understood also that the terms "vapor," "gas" and "gases" as used herein are employed substantially interchangeably and in a descriptive rather than a limiting sense to denote that portion of the feedstock which is in a non-liquid state under the conditions of operation. Likewise, the term "aerated" as herein used applies where the aerating medium is any gaseous or vaporous fluid.

This invention therefore provides a highly versatile and flexible tray that can be constructed at low cost, made in sections or in one piece and provide high efficiency and stability throughout an extremely wide range of operating conditions. At the same time the design can be controlled to effect any desired operational characteristics.

What is claimed is:

1. A bubble tray for the countercurrent contacting of a downwardly flowing relatively heavy liquid with an upwardly flowing relatively lighter fluid, said tray having a perforated area substantially coextensive with the area of the tray, the openings of said perforated area being of substantially uniform size and providing the sole passageway for the flow of fluid upwardly and downwardly through the tray, and said tray being of a surface configuration to provide in said perforated area a plurality of depressed portions in the bottom of which certain of said uniformly sized openings form drain openings through which it is intended liquid, primarily, shall drain downwardly from a body of liquid supported on said tray, and to provide relative to and alongside said depressed portions, a plurality of companion raised portions in the top of which certain others of said uniformly sized openings form vent openings through which it is intended said relatively lighter fluid, primarily, shall escape upwardly through said body of liquid, the tray having, for given circumstances, a relative area of depressed portions and companion raised portions determined by the relative amount of down-flowing relatively heavy liquid and upflowing relatively lighter fluid that is to flow through the tray, having an area of depressed portions determined by the liquid downflow capacity desired for the tray, having a depth of depressed portions determined by the liquid head therein desired for drainage, and having its drainage openings and its vent openings of a size and number determined by the relative rates of drain and vent flow desired and the requisite height of liquid to be maintained above the surface of the raised portions of the tray, said depressed portions and companion raised portions enabling the creation on the tray surface of separate zones of liquid overlying the drain and vent openings, respectively, and imposing higher static head on the drain openings than on the vent openings, whereby liquid supported on said tray is adapted to drain continuously in a stable manner from the depressed portions of the tray while the relatively lighter fluid is adapted to escape continuously in a stable manner from the raised portions of the tray.

2. A bubble tray in accordance with claim 1, said tray being of a surface configuration to provide separate sets of depressed portions and raised portions, the set units paralleling each other and the units of one set alternating with those of another.

3. A bubble tray in accordance with claim 2, said depressed portions and said raised portions being of substantially rectangular configuration in vertical cross section.

4. A bubble tray in accordance with claim 1 in which the drain and vent openings are each of a diameter in the range of from about one-eighth of an inch to about five-eighths of an inch.

5. A bubble tray in accordance with claim 1 in which each depressed portion has a depth in the range of from about one-half inch to about six inches.

6. Apparatus for the countercurrent contacting of a relatively heavy liquid with a relatively lighter fluid comprising a tower down which the former is to flow countercurrent to the latter, and at least one bubble tray in the path of flow of said counterflowing mediums, said bubble tray being sealed about its entire circumferential periphery to the tower wall and having a perforated area substantially coextensive with the area of the tray for supporting a body of liquid, the openings of said perforated area being of substantially uniform size and providing essentially the sole passageway for the flow of fluid upwardly or downwardly through the tray, said tray being of a surface configuration to provide in said perforated area a plurality of depressed portions in the bottom of which certain of said uniformly sized openings provide drain openings through which it is intended liquid, primarily, shall drain downwardly from a body of liquid supported on said tray, and to provide relative to and alongside said depressed portions, a plurality of companion raised portions in the top of which certain others of said uniformly sized openings form vent openings through which it is intended said relatively lighter fluid, primarily, shall escape upwardly through said body of liquid, the tray having, for given circumstances, a relative area of depressed portions and companion raised portions determined by the relative amount of downflowing relatively heavy liquid and upflowing relatively lighter fluid that is to flow through the tray, having an area of depressed portions determined by the liquid downflow capacity desired for the tray, having a depth of depressed portions determined by the liquid head therein desired for drainage, and having its drainage openings and its vent openings of a size and number determined by the relative rates of drain and vent flow desired and the requisite height of liquid to be maintained above the surface of the raised portions of the tray, said depressed portions and companion raised portions enabling the creation on the tray surface of separate zones of liquid overlying the drain and vent openings, respectively, and imposing higher static head on the drain openings than on the vent openings, whereby liquid supported on said tray is adapted to drain continuously in a stable manner from the depressed portions of the tray while the relatively lighter fluid is adapted to escape continuously in a stable manner from the raised portions of the tray.

7. Apparatus in accordance with claim 6 in which a plurality of said trays are positioned in said tower one above the other, each depressed portion of a tray being substantially in alignment with a raised portion of an adjoining tray.

References Cited in the file of this patent

UNITED STATES PATENTS

| 999,320 | Kyll | Aug. 1, 1911 |
| 1,621,728 | Jordan | Mar. 22, 1927 |
| 1,744,134 | Morrell | Jan. 21, 1930 |
| 2,333,193 | Persson et al. | Nov. 2, 1943 |
| 2,609,276 | Casler et al. | Sept. 2, 1952 |
| 2,669,505 | Rhys et al. | Feb. 16, 1954 |

FOREIGN PATENTS

| 233,878 | Great Britain | May 21, 1925 |
| 633,433 | Germany | July 27, 1936 |
| 992,066 | France | June 27, 1951 |